US012595015B2

(12) United States Patent
Rizzo

(10) Patent No.: US 12,595,015 B2
(45) Date of Patent: Apr. 7, 2026

(54) CYCLING POWER METER

(71) Applicant: CAMPAGNOLO S.R.L., Vicenza (IT)

(72) Inventor: Antonio Rizzo, Montagnana (IT)

(73) Assignee: Campagnolo S.R.L., Vicenza (IT)

( * ) Notice: Subject to any disclaimer, the term of this patent is extended or adjusted under 35 U.S.C. 154(b) by 189 days.

(21) Appl. No.: 18/355,236

(22) Filed: Jul. 19, 2023

(65) Prior Publication Data

US 2024/0043085 A1 Feb. 8, 2024

(30) Foreign Application Priority Data

Aug. 5, 2022 (IT) ........................ 102022000016782

(51) Int. Cl.
| | |
|---|---|
| *B62J 45/00* | (2020.01) |
| *B62J 45/411* | (2020.01) |
| *B62J 45/414* | (2020.01) |
| *B62J 45/421* | (2020.01) |
| *G01L 5/00* | (2006.01) |
| *G01L 27/00* | (2006.01) |

(52) U.S. Cl.
CPC ........... *B62J 45/421* (2020.02); *B62J 45/411* (2020.02); *B62J 45/414* (2020.02); *G01L 5/0095* (2013.01); *G01L 27/002* (2013.01)

(58) Field of Classification Search
CPC ...... B62J 45/421; B62J 45/411; B62J 45/414; B62J 45/41; G01L 5/0095; G01L 27/002; G01L 25/006; G01L 3/242; G01L 5/00; B62M 6/50
See application file for complete search history.

(56) References Cited

U.S. PATENT DOCUMENTS

| | | | | |
|---|---|---|---|---|
| 5,031,455 A * | 7/1991 | Cline | ..................... | B62J 45/423 |
| | | | | 73/862.28 |
| 8,825,279 B2 | 9/2014 | Kitamura et al. | | |
| 2010/0050785 A1* | 3/2010 | Roessingh | ............... | B62M 9/12 |
| | | | | 73/862.325 |
| 2011/0120232 A1* | 5/2011 | Lassanske | ............. | B60B 27/047 |
| | | | | 702/41 |
| 2014/0074348 A1* | 3/2014 | Kitamura | ................. | B62M 6/50 |
| | | | | 701/33.1 |
| 2014/0200835 A1* | 7/2014 | Carrasco Vergara | ..... | G01L 3/10 |
| | | | | 702/42 |

(Continued)

OTHER PUBLICATIONS

International Search Report and Written Opinion for Italian Application No. 102022000016782 filed on Aug. 5, 2022 on behalf of Campagnolo S.R.L., Dated: Mar. 17, 2023, 6 pages. (Original + Partial Translation).

*Primary Examiner* — Peter D Nolan
*Assistant Examiner* — Peter Y Ning
(74) *Attorney, Agent, or Firm* — Ipsilon USA—NLO

(57) ABSTRACT

A cycling power meter includes at least one sensor and a controller. The controller is configured to derive a cycling power based on at least one output of the least one sensor and perform a zero-power calibration on the basis of the at least one output in a non-load condition. The calibration occurs through the steps of: computing at least one statistical index relative to the at least one output; evaluating whether the at least one statistical index A) falls or B) does not fall within a respective predetermined set of values; and performing the calibration in case A) or not performing the calibration in case B).

16 Claims, 5 Drawing Sheets

(56)  References Cited

U.S. PATENT DOCUMENTS

| | | | |
|---|---|---|---|
| 2015/0331061 A1* | 11/2015 | Hirschbold | G01R 31/3835 |
| | | | 324/433 |
| 2016/0008663 A1* | 1/2016 | Zhu | G01L 3/108 |
| | | | 482/8 |
| 2017/0292881 A1* | 10/2017 | Jennings | B62L 1/00 |
| 2018/0141613 A1* | 5/2018 | Collen | G01L 3/108 |
| 2019/0175986 A1* | 6/2019 | Golesh | A63B 21/4049 |
| 2021/0171153 A1* | 6/2021 | Nichols | G01L 3/24 |

* cited by examiner

40

42

CYCLING POWER METER

CROSS REFERENCE TO RELATED APPLICATIONS

The present application claims priority to Italian Patent Application No. 102022000016782 filed on Aug. 5, 2022, the contents of which are incorporated herein by reference in their entirety.

FIELD

The present invention relates to a cycling power meter or pedaling power meter.

BACKGROUND

Bicycles are often provided with a cycling power meter, briefly power meter, in order to provide the user with information, directly or through a cycle computer mounted on board or after downloading to a general purpose computer, and/or for use in controlling an electronic gearshift and/or for use in driving a motor in a pedal-assisted bicycle.

Cycling power meters are, in fact, measurement tools, typically of the digital type and thus which perform a sampling of the cyclist's power.

Measurement tools may generally require a scaling or calibration operation in order to better establish the correspondence law between the readings of the tool and the values of the quantity that the tool should measure, for example to take specific mounting conditions into account.

Furthermore, during the life of a measurement tool it often happens that thermal variations and/or ageing of the components making it up cause a drift, which can cause or increase the measurement error, and/or a worsening of at least one of accuracy, sensitivity, and precision. In order to compensate for the drift, a periodic scaling or calibration of the tool is usually necessary (for example, every 3 months, 1 year, etc . . . ). Because the signals involved in a cycling power meter are quite weak, correct calibration or scaling of such a device is particularly important.

In order to keep cycling power meters calibrated, in the cycle computer used to interface therewith, a calibration functionality is usually provided for, which may be initialized upon explicit user decision and, sometimes, can be set to automatic, not necessarily periodic operation.

Document U.S. Pat. No. 8,825,279B2 discloses a bicycle power sensing apparatus comprising a power sensing device, a calibration signal generating device, and a controller operatively arranged to receive a calibration signal from the calibration signal generating device. The controller calibrates the power sensing device as being at a non-load level of zero power input upon receiving the calibration signal. The calibration signal generating device may be for example a user operated input device (e.g., a switch), a timer, a bicycle speed generating device such as a speed sensor, a crank rotation detecting device such as a cadence sensor, which generates the self-calibration signal when it does not detect any rotation of the crank for a predetermined time. Once the signal has been generated, the system of that document—as best understood—checks that there is a relative motion between a drive member and a driven member of a transmission, such as the components of the bottom bracket, and proceeds to self-calibration only if there is a relative motion (and therefore, in the case of the bottom bracket, there is no torque transmission still there being a rotation of the wheel).

The Applicant observes that this system does not perform calibration exactly when the bicycle is completely stationary, although even in this case there is no pedaling movement; furthermore, also during pedaling, momentary presences of the mutual motion being controlled may occur, during which it may happen that the auto-calibration occurs, under non-optimal conditions.

However, if scaling occurs under incorrect conditions, namely that do not actually reflect a non-load condition in the case of setting the zero of measured power, the measurement error may even be increased, because the scaling may in turn bring in an artificial offset on the measurements instead of compensating for one inherent in the tool.

SUMMARY

The technical problem at the basis of the invention is to make the cycling power detection more accurate by optimizing the conditions under which the calibration or scaling of the detector is performed.

In an aspect, the invention relates to a cycling power meter comprising at least one sensor and a controller configured to derive a cycling power on the basis of at least one output of said least one sensor, wherein the controller is configured to perform a zero-power calibration on the basis of the output of said at least one sensor in a non-load condition, characterized in that the controller is configured to perform the calibration through the steps of:

computing at least one statistical index relative to said at least one output, evaluating whether said at least one statistical index falls within a respective predetermined set of values, and in case of an affirmative outcome of the check, performing the zero-power calibration, otherwise not performing it.

In the present description and in the attached claims, under the expression "non-load", a condition corresponding to the absence of pedaling is meant to be indicated, namely a condition of absence of forces that generate a rotation of the pedal crank.

In the present description, under the expression "controller", a data processing system is meant to be indicated, for example a microcontroller; the data processing system may also be distributed in plural devices, for example plural microcontrollers. In the present description, under the expression "set of values", a range of values or the union of plural non-contiguous ranges of values is meant to be indicated, wherein the range or each range may be closed, open or half-open, namely it may include both extremes, no extreme, or only one extreme.

In the present description, under the expression "statistical index relative to an output", a statistical index relative to the quantitative change of the output signal of the sensor over time is meant to be indicated, possibly after sampling and/or quantization and/or processing of the signal itself.

Through the statistical analysis of the output of the sensor(s) and the check that the statistical indexes fall within predetermined ranges of values, for example defined by tolerance and acceptability thresholds, it is accurately recognized whether the non-load conditions are met, and it is avoided to perform calibration when, fortuitously, the conditions are only instantaneously equal or similar to non-load conditions. The calibration of the power meter thus proves to be more accurate, as consequently the measurement performed thereby.

The at least one sensor preferably comprises at least two sensors.

Said at least one statistical index may be selected from the group consisting of average, variance, average of average values, variance of average values, standard deviation, standard deviation of average values, variance based on the variances.

Alternatively or additionally, the controller may be configured to compute said at least one statistical index through the steps of:

i) obtaining a first number, M, of samples from said at least one output ii) computing said at least one statistical index relative to said first number, M, of samples.

In the present description and in the attached claims, under the expression "obtaining a sample from an output", it is meant to indicate obtaining a numerical datum directly as output of a digital sensor and/or by quantization of an output of an analogue sensor and/or by one of the previous operations after processing of the sensor output, for example through filtering, amplification, and the like.

Or, the controller may be configured to compute said at least one statistical index through the steps of:

a) obtaining samples from said at least one output, b) computing at least one preliminary statistical index relative to a first predetermined number, M, of last samples among said samples, c) storing said at least one preliminary statistical index (as a statistical datum), d) repeating steps b), c)—during execution of step a)—until obtaining a second number, N, of preliminary statistical indexes, e) computing said at least one statistical index relative to said preliminary statistical indexes.

In the present description and in the attached claims, under the expression "last samples", the most recent—in time—samples are meant.

Said at least one preliminary statistical index may be selected from the group consisting of average, variance and standard deviation.

With this provision, according to which a statistical analysis is performed on statistical data (the preliminary statistical indexes) being in turn a result of a statistical analysis on samples of the sensor output, it proves to be possible to extend the time duration of monitoring of the sensor output without excessive memory occupation, still preserving statistical information on the output. According to how the number M and the sampling frequency are selected, the overlapping of the sets of samples onto which two immediately successive preliminary statistical indexes are computed changes.

The controller may be configured to check, before at least step c) and possibly before step b), that predetermined minimum conditions are met, indicative of absence of pedaling, and in case the check has a negative output, to zero the stored statistical indexes and preliminary statistical indexes and restart the repetition of steps b), c) according to step d).

Thus, a preliminary check or prerequisite check is provided for, applying comparatively coarse criteria with respect to the criteria used in the evaluation of whether the statistical index falls within the predetermined set of values.

The cycling power meter may be embedded in a bicycle pedal crank and said predetermined minimum conditions may comprise alignment of the pedal crank with the vertical.

The controller may be configured to store the first number, M, of samples in a first circular buffer and/or, if provided for, to store the second number, N, of preliminary statistical indexes in a second circular buffer.

Alternatively or additionally to other of the secondary features indicated above, the controller may be configured to further perform the zero-power calibration in a manual mode, and, during the zero-power calibration in the manual mode, to:

if the first number, M, of samples, respectively the second number, N, of preliminary statistical indexes is not available (so that the amount of information is not statistically significant), set said predetermined set of values to a default set of values, if the first number, M, of samples, respectively the second number, N, of preliminary statistical indexes is available (so that the amount of information is statistically significant), set said predetermined set of values to a user set of values computed as a predetermined function of said at least one statistical index relative to said at least one output.

In the present description and in the attached claims, under the expression "default", a value preset in the program upon leaving the factory is meant to be indicated.

Through this provision, it proves to be possible to dynamically update the tolerance/acceptability thresholds of the outputs of the sensors, thus customizing the cycling power meter as a function of the mounting onto the specific bicycle, for example according to the mounted pedals and/or as a function of the temperature in the region where the bicycle is used, and/or of other factors.

If the first number, M, of samples, respectively the second number, N, of preliminary statistical indexes is available, the controller may also check whether the statistical index falls within the default set of values and, in case the check gives a negative outcome, set instead said predetermined set of values to said default set of values.

The predetermined function may be a direct proportionality function.

When the cycling power meter is embedded in a bicycle pedal crank, said at least one sensor may comprise at least one torque meter and an accelerometer, and said at least one output may comprise at least one electric signal related to a torque and an electric signal related to an acceleration along the longitudinal axis of the pedal crank.

Said at least one sensor may further comprise at least one strain gauge and said at least one output may comprise at least one electric signal related to the strain gauge resistance.

Alternatively or additionally, said at least one output may further comprise an electric signal related to an acceleration along the tangential direction to a circular motion of an end of the pedal crank carrying a pedal.

Alternatively or additionally, said at least one sensor may further comprise at least one thermometer, and said at least one output may further comprise at least one electric signal related to a temperature.

Alternatively or additionally, said at least one output may further comprise an electric signal related to an acceleration along a rotation axis of the pedal crank.

In an aspect, the invention relates to a cycling power meter comprising at least one sensor and a controller configured to compute a cycling power based on at least one output of said at least one sensor, wherein the controller is configured to perform a zero-power calibration on the basis of the output of said at least one sensor in a non-load condition, characterized in that the controller is configured to:

in an automatic mode, subordinate the zero-power calibration to the check that at least one output of said at least one sensor, or a related statistical index, falls within a respective predetermined set of values, and

in a manual mode, set said respective predetermined set of values as a function of a, or respectively of said, statistical index relative to at least one output of said at least one sensor.

According to this aspect, in the manual mode the controller may check whether the statistical index falls within a default set of values and, in case the check gives a negative outcome, set said respective predetermined set of values to a respective default set of values.

Secondary features of a cycling power meter according to this aspect correspond to the secondary features of a cycling power meter according to the first aspect mentioned above, mutatis mutandis.

BRIEF DESCRIPTION OF THE DRAWINGS

Further features and advantages of the invention will be better highlighted by the description of preferred embodiments thereof, made with reference to the attached drawings, wherein.

DETAILED DESCRIPTION

A cycling power meter includes in general one or more sensors and a controller configured to compute the cycling power on the basis of the output of said one or more sensors. For example, a cycling power meter may include a torque meter and a speed or pedaling cadence meter, and compute the cycling power as the product of the measured torque and of the angular speed. The torque meter may for example be applied to a pedal crank (to its body or to a spoke thereof for connection to a toothed wheel), to the bottom bracket, to a pedal, to a toothed wheel (chainring or sprocket) of the transmission, and similar; the speed or cadence meter may for example be applied or comprise components applied to a wheel, to the bottom bracket, to a toothed wheel (chainring or sprocket) of the transmission, to a pedal crank, to a spoke, to a wheel spoke, or to a chain, and similar.

Hereinbelow in the present description, reference will mainly be made, but merely by way of non-limiting example, to the case of a cycling power meter embedded in a pedal crank.

Figure 1:
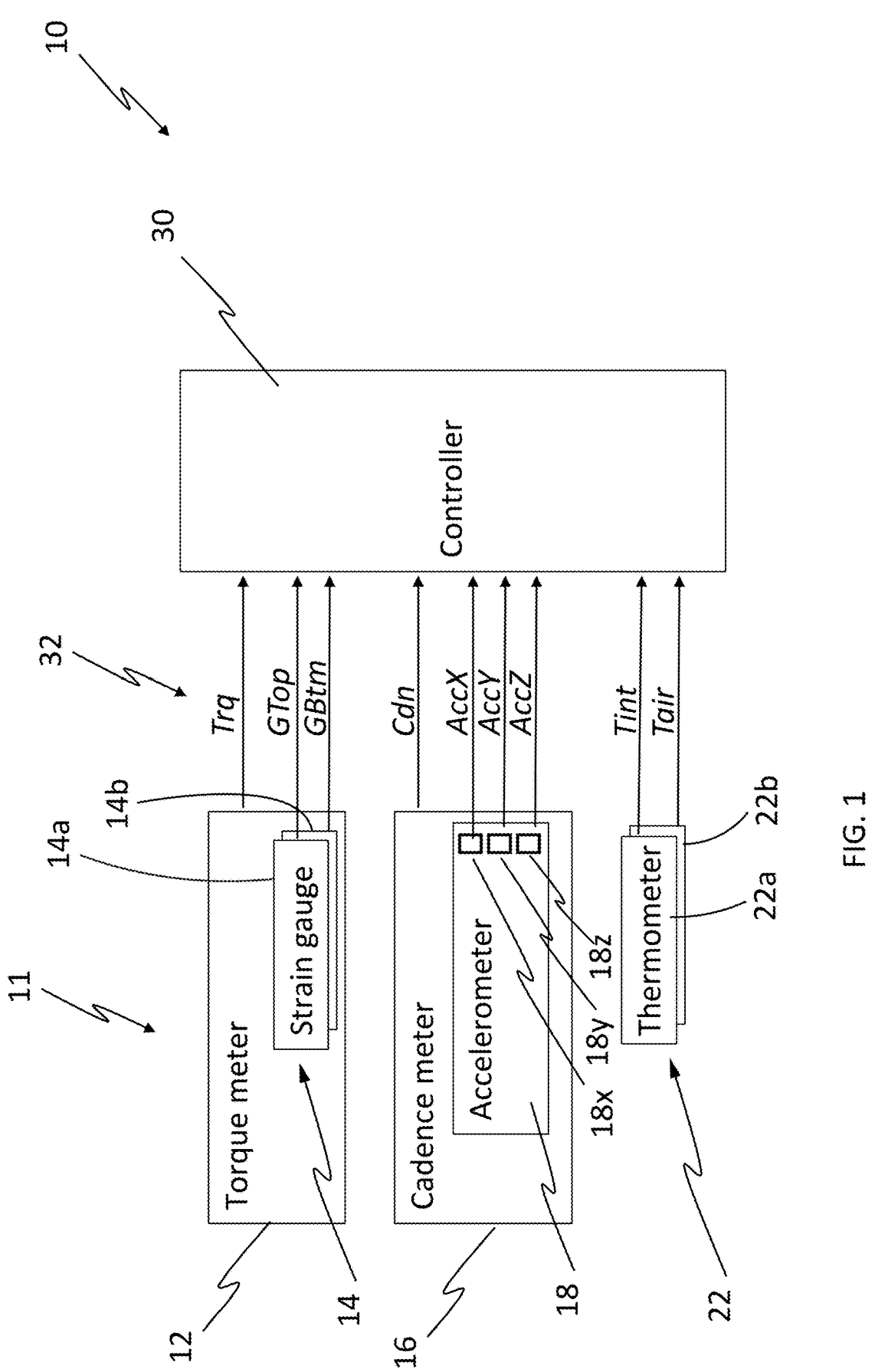
FIG. 1 is a block diagram of an illustrative cycling power meter.

With reference to FIG. 1, an illustrative cycling power meter 10 embedded in a pedal crank comprises a torque meter 12 comprising one or more strain gauges 14, for example two strain gauges 14a, 14b, a cadence meter 16 including a three-axes accelerometer 18, thus having three sensors 18x, 18y, 18z, and a controller 30. The illustrative cycling power meter 10 further includes at least one thermometer 22, for example a meter 22a of the internal temperature of the pedal crank and a meter 22b of the external temperature, of the air licking the pedal crank. The strain gauges 14a, 14b may for example be applied to the upper and bottom faces of the pedal crank considered in the horizontal position, with the pedal forward with respect to the rotation axis of the pedal crank. Alternatively, at least one strain gauge may be applied to a spoke for connecting the pedal crank to a toothed wheel.

The three axes X, Y, Z of the accelerometer may for example extend along the longitudinal axis of the pedal crank, along the rotation axis of the pedal crank, and along the tangential direction to the circular motion of rotation of the end carrying the pedal.

The torque meter 12, each strain gauge 14, the cadence meter 16, the accelerometer 18 in its entirety, the sensors 18x, 18y, 18z of the accelerometer 18, each thermometer 22 represent in general sensors 11 of the cycling power meter 10.

The controller 30 is configured, in a manner known per se, to compute a cycling power on the basis of the outputs 32 of the sensors 11, in particular of the torque Trq, and of the cadence Cdn. The other outputs of the other sensors 11 comprise: an electric signal GTop, GBtm related to the electric resistance of each strain gauge 14a, 14b, for example a voltage signal; the accelerations AccX, AccY, AccZ along each axis output by the sensors 18x, 18y, 18z of the accelerometer 18; the internal temperature Tint and the air temperature Tair output by the thermometers 22a, 22b. All these outputs 32 are time-varying and in particular are random variables, whose variable names indicated above are totally arbitrary. Depending on the sensor, these may be analog or digital variables or one or more analog variables and other digital variables.

In order to take the drift caused by ageing of the components and temperature changes and/or the specific mounting conditions into account, for example the pedal type and the average temperature in the region where the bicycle is used, the controller 30 is configured to perform a zero-power scaling or calibration, which should correspond as precisely as possible to the non-load condition. For example, for scaling, the controller may set a deviation or offset value to the value measured in non-load conditions, and algebraically add that deviation or offset value to the value measured in the normal operating mode. It is understood that when the scaling occurs manually, it is the operator who has to ensure that the non-load conditions are met: in the case of a cycling power meter embedded in a pedal crank, these typically comprise the vertical position and immobility of the pedal crank.

In the cycling power meter disclosed herein, the controller is configured to perform the scaling only or also in an automatic mode, wherein it recognizes whether the non-load conditions are met. A non-limiting example mode is described hereinbelow.

Figure 2:
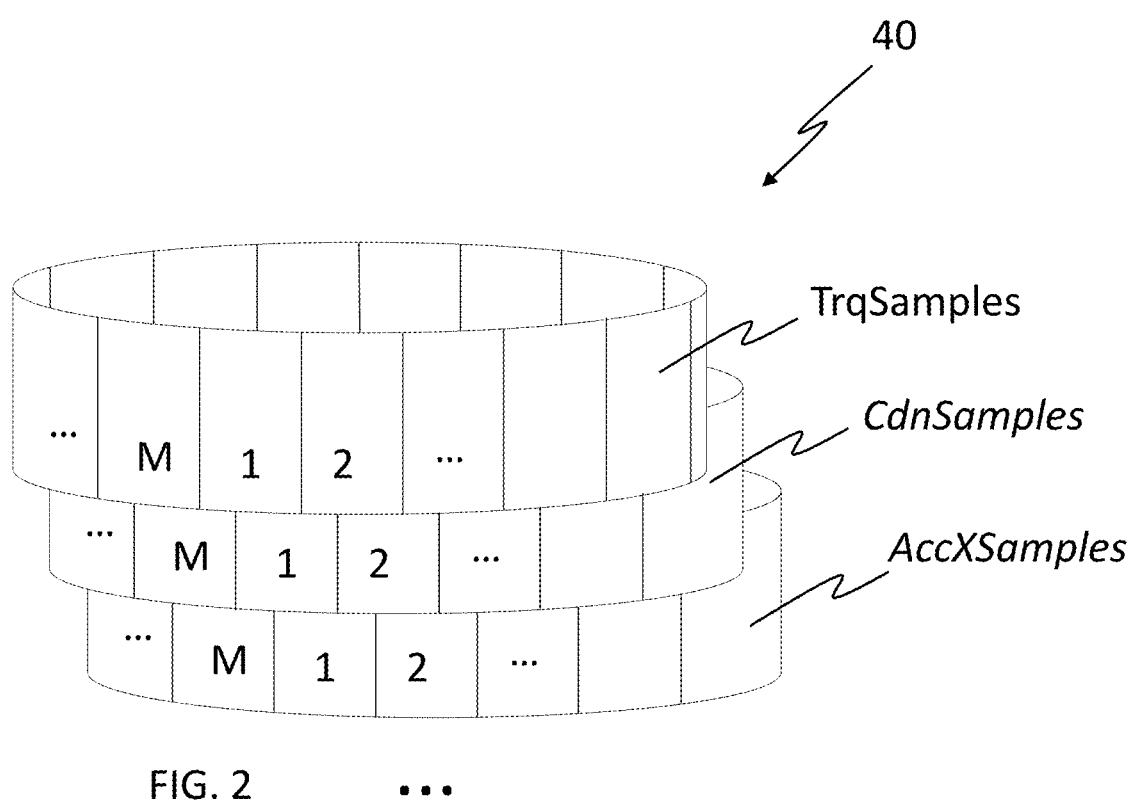
FIGS. 2 and 3 diagrammatically show two data structures that may be used by a cycling power meter disclosed herein.
Figure 3:
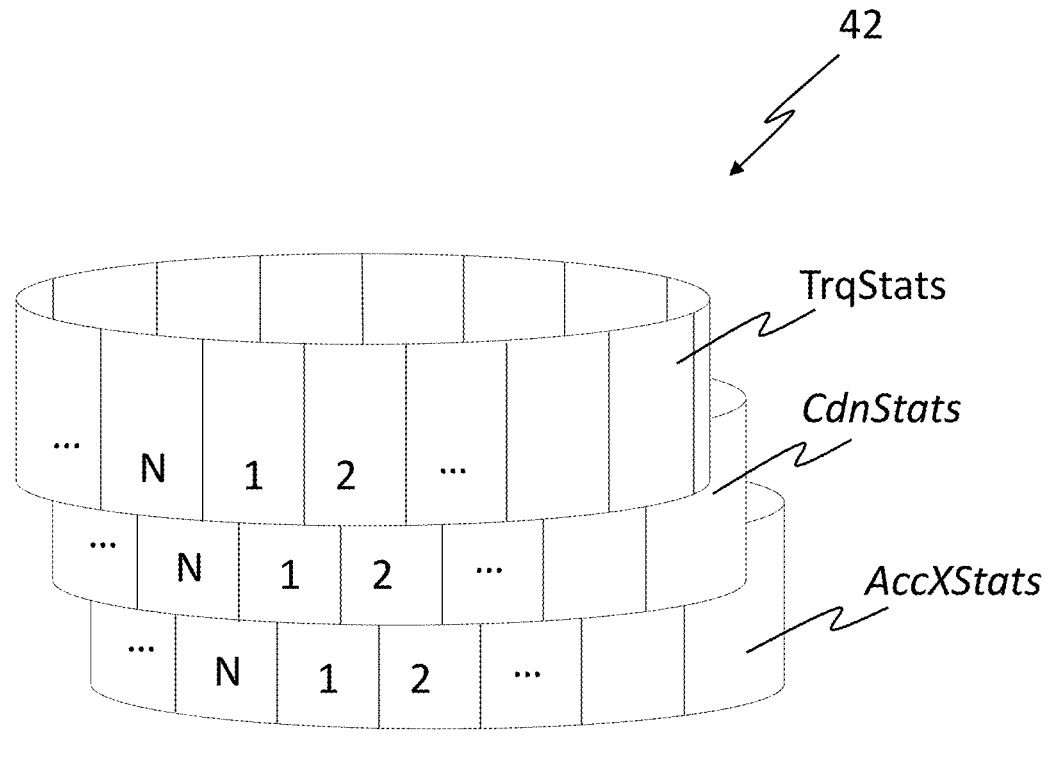

With reference to FIGS. 2 and 3, in the automatic scaling mode, the controller 30 uses for example, for each one among the outputs 32 of the sensors 11 of interest for calibration purposes, which not necessarily are all of the outputs 32 of the cycling power meter itself, two circular shift registers or circular buffers, one named herein sample buffer 40 or sometimes first buffer, arbitrarily referred to as Samples, and one named herein statistics buffer 42 or sometimes second buffer, arbitrarily referred to as Stats. For example, there may be provided for a buffer TrqSamples and a buffer TrqStats, associated, in the manner described below, to the output of the torque meter 12; a buffer CdnSamples and a buffer CdnStats associated, in the manner described below, to the output of the cadence sensor or meter 16; a buffer AccXSamples and a buffer AccXStats associated, in the manner described below, to the output of the sensor 18x of acceleration along axis X; and so on. The controller 30 also uses temporary variables, as will be clear hereinafter, which are suitably stored in memory locations or data structures not shown.

The sample buffers 40 contain a predetermined number M of samples and are filled at a sampling frequency f_smpl, thus defining a time observation window having a width W_Samples=M/f_smpl.

It is noticed that the acquisition or the sampling of the outputs 32 of the sensors 11 (cf. block 102 of FIG. 3 later described) is an operation provided per se in conventional cycling power meters, however, usually at most the value of the last sample is stored, in order to use it in computations and/or to display it to the user, while usually plural sample values are not stored.

The statistics buffers 42 contain a predetermined number N of preliminary statistical indexes which in turn serve as statistical data onto which other statistical indexes are computed, and are filled, in the manner described below, at a frequency f_stats, thus defining a time observation window having a width W_stats at most equal to W_stats=N*W_Samples.

Each element of a statistics buffer 42 Stats may in turn have a record data structure and contain plural statistical data (preliminary statistical indexes) related to a same output 32, and reference to this case will be made to hereinbelow; alternatively, for each output 32 plural statistics buffers 42 Stats may be provided for.

It is noticed that the statistical analysis of the outputs of the sensors 11 is an operation not known in conventional cycling power meters.

Figure 4:
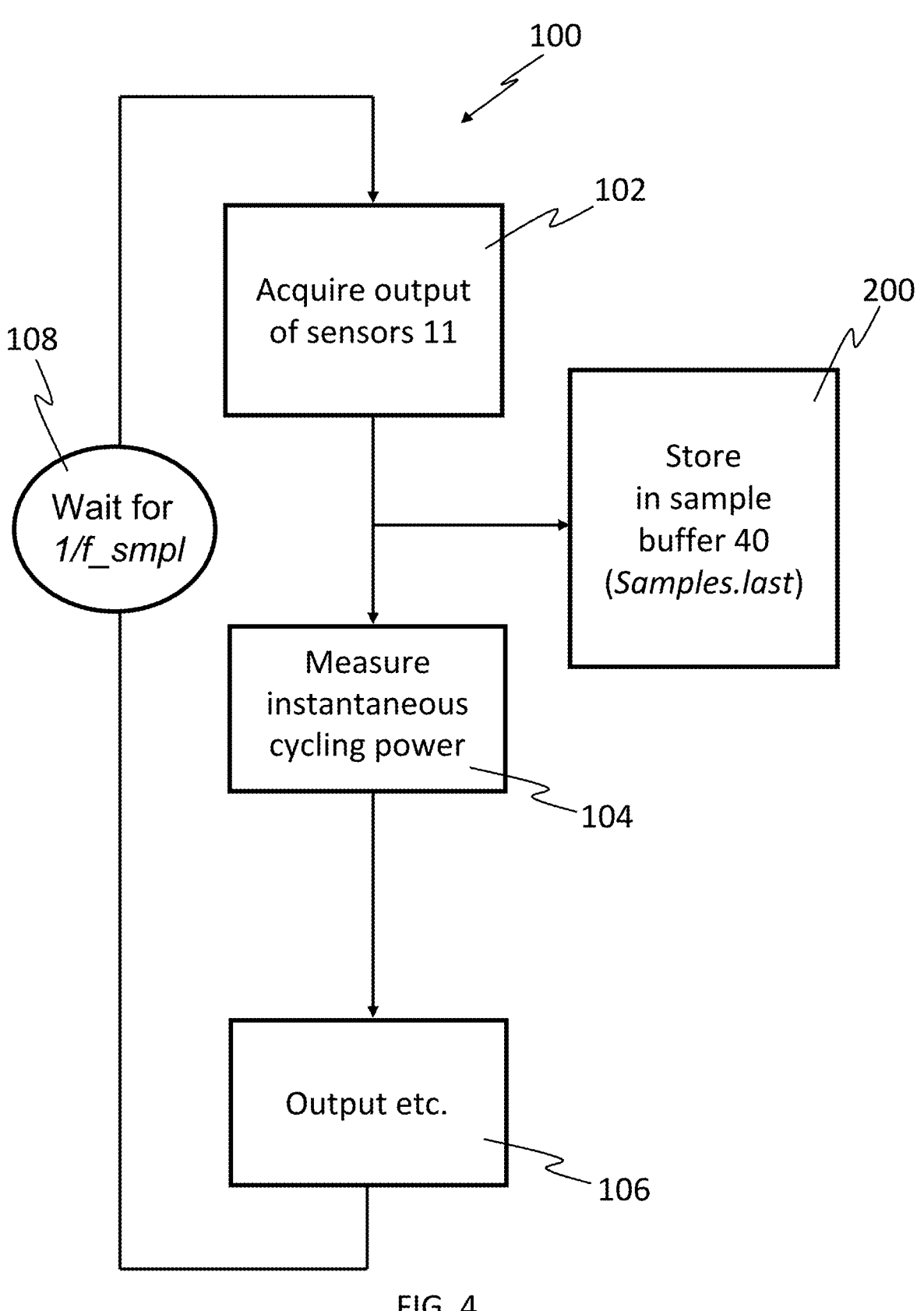
FIGS. 4-6 are block diagrams illustrative of a possible operation of a cycling power meter disclosed herein.

With reference to FIG. 4, during the ordinary operation 100 for cycling power measurement, the controller 30 proceeds, in block 102, with acquiring the outputs 32 of the sensors 11, namely with reading the instantaneous value of the output, possibly quantized in the case of analog output. In a subsequent block 104, the controller 30 derives the instantaneous cycling power on the basis of the outputs 32 of the sensors 11 just acquired. In a subsequent block 106, the controller 30 proceeds with outputting the instantaneous cycling power, for example displaying it on a display, storing it in a log file, using it for controlling an electronic gearshift, using it for driving a motor in the case of a pedal-assisted bicycle etc. The controller 30 may proceed with filtering, amplifying, and in general processing operations of the output signals 32 of the sensors 11, before or during or after the acquisition block 102, not shown for the sake of simplicity.

According to the subject-matter disclosed herein, the controller 30 further proceeds, in a block 200, with storing the acquisitions of the outputs 32 of the sensors 11 in the respective sample buffer 40, in the current position of the respective pointer, arbitrarily indicated herein with the notation Samples.last (for example, a value in TrqSamples.last, a value in CdnSamples.last, a value in AccXSamples.last are stored).

The above operations are repeated at a predetermined sampling frequency f_smpl, as schematized by block 108 of waiting for a time 1/f_smpl, monitored for example by a timer.

Merely by way of non-limiting example, the sampling frequency may be 400 Hz, equal to sampling every 2.5 ms, and the number of samples M stored in the sample buffer 40 may be M=1200, so that the sample buffer 40 Samples corresponds to a time observation window of 3 seconds. The sampling frequency may be comprised for example in the range between 1 Hz and 1 GHz, preferably between 1 Hz and 5 kHz.

Figure 5:
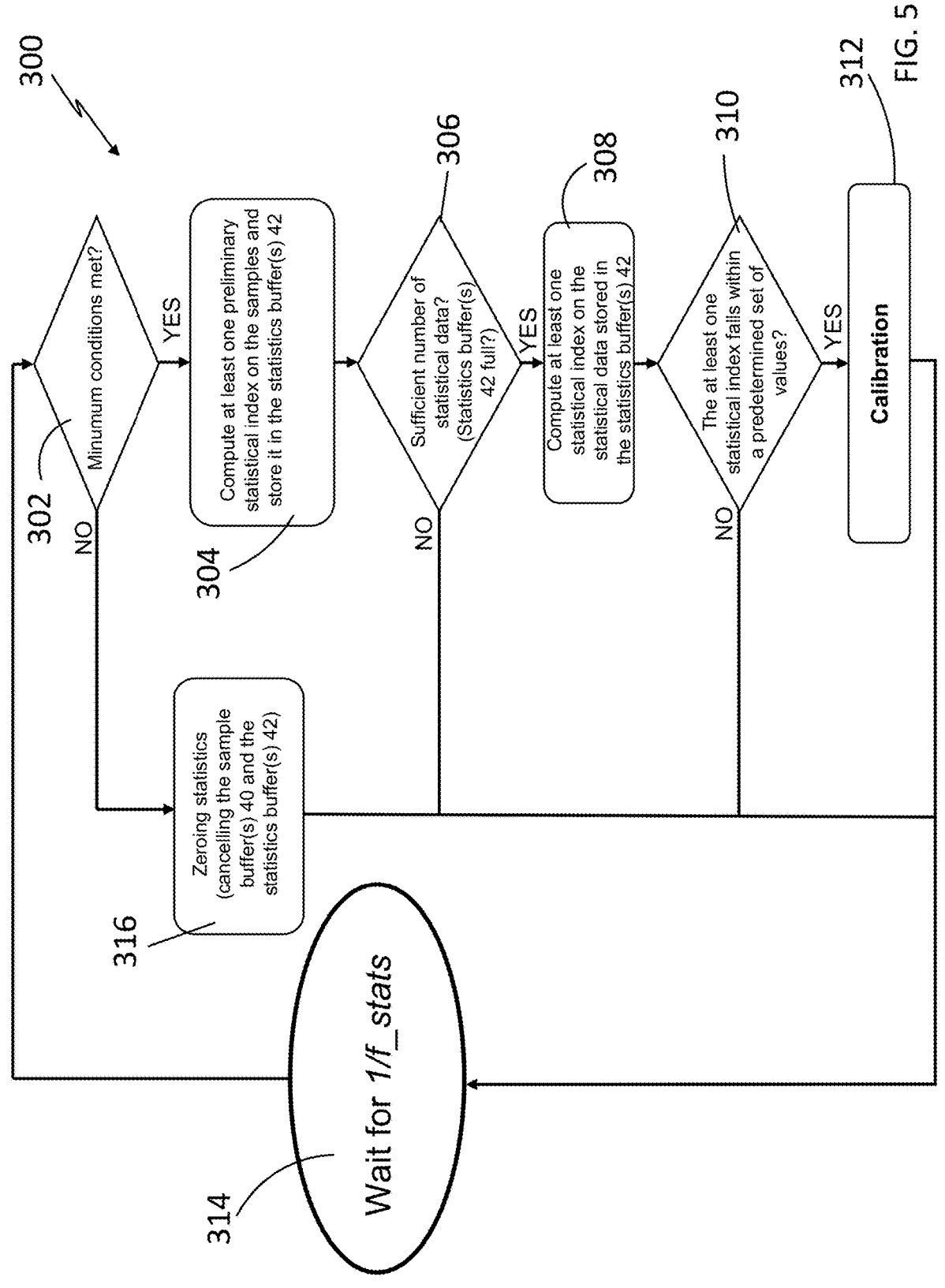

With reference to FIG. 5, in order to proceed with scaling or calibration 300, the controller 30 initially proceeds, in an optional block 302, with checking that predetermined minimum conditions indicative of absence of pedaling are met, operation also named herein prerequisite check 302 or preliminary check 302. In the case of a cycling power meter embedded in a pedal crank such as the illustrative cycling power meter 10, these predetermined minimum conditions may include for example a substantially zero absolute value of the cadence Cdn (indicative of the fact that the pedal crank is essentially still) and a sufficiently high absolute value of the acceleration along the longitudinal axis AccX (indicative of the fact that the pedal crank is essentially vertical).

The controller 30 may use, for the evaluation, the value contained in the sample buffer 40 of the respective output, in the current position of the respective pointer, that as mentioned above is arbitrarily named herein with the notation Samples.last.

The checks carried out in the operation of block 302 may be described by respective thresholds such as, again merely as an example, in the following formulae:

$$|CdnSamples.last| \leq |ThCdn|, \text{ for example}=0.$$

$$|AccX.last| \geq |ThAccX|.$$

Alternatively, the controller 30 may use, for the evaluation, the value acquired in block 102, for example the current value Cdn, AccX of the respective output 32.

Merely by way of non-limiting example, it may be checked that AccX or AccXSamples.last comprised, in absolute value, between 0.6 g and 1 g, preferably between 0.8 g and 1 g, holds true, wherein g is the value of the gravitational acceleration.

As far as cadence is concerned, it may be considered that values indicative of an effective pedaling are comprised in the range between 20 and 180 rpm (0.33 and 3 Hz, respectively) because values less than 20 rpm may represent noise and measurement errors, while it may be considered that values higher than 180 rpm are implausible. Thus, in the check of block 302, it may be checked that the cadence does not fall within that range 20-180 rpm.

In case the check of block 302 gives a positive outcome, the controller provides in a block 304 for computing one or more preliminary statistical indexes relative to the outputs 32 of the sensors 11, on the basis of the M samples stored in the sample buffer 40, which thus are the last acquired M samples of the outputs 32 of the sensors 11, as well as for storing the computed preliminary statistical index in the respective statistics buffer 42 (as statistical datum for further statistical evaluations), in the current position of the respective pointer, arbitrarily named with the notation Stats.last herein (for example, a preliminary statistical index in TrqStats.last, one in CdnStats.last, one in AccXStats.last are stored).

Merely by way of example, as preliminary statistical index, for one or more of the outputs 32, an average and/or a variance and/or a standard deviation may be computed.

More specifically, still merely by way of example, one may compute the average and the variance of the acceleration along the longitudinal axis of the pedal crank, arbitrarily indicated herein as Avg_AccX, $Var^2$_AccX; the average and the variance of the output of the strain gauges, arbitrarily indicated herein as Avg_GTop, $Var^2$_Gtop, Avg_GBtm, $Var^2$_GBtm; the average and the variance of the torque, arbitrarily indicated herein as Avg_Trq, $Var^2$_Trq, etc.

As known, the average of W samples of a random variable V is given by formula:

$$\text{Avg\_V} = \frac{1}{W} \sum_{k=1}^{W} Vk$$

As known, the variance of W samples of a random variable V is the arithmetic average of the squares of the deviations of the values from their arithmetic average, and is given by formula:

$$\text{Var}^2\_V = \frac{1}{W} \sum_{k=1}^{W} (V_k - \text{Avg\_V})^2$$

As known, the variance is representative of the distribution of the samples with respect to their average: the lower the variance, the greatest the concentration of the samples about the average value, the greatest the variance, the greatest the dispersion of the values with respect to the average value. A low variance describes a mechanical system in a static or quasi-static condition (pedal crank still or essentially still), while a high variance describes a mechanical system in a dynamic condition.

As an alternative to what has been shown, the computation of the at least one preliminary statistical index may be carried out before the check of block 302, subordinating to the positive outcome of the check of block 302 only the storing of that preliminary statistical index (as a statistical datum).

The controller 30 thus checks, in a block 306, whether a sufficient number of statistical data (preliminary statistical indexes) is available, for example checking whether the statistics buffer 42 Stats is full (for each of the outputs 32 of the sensors 11 of interest).

In case the check gives an affirmative outcome, thus when a statistically significant amount of information is available, the controller provides in block 308 for computing one or more statistical indexes of the preliminary statistical indexes of the statistics buffer 42 (for each of the outputs 32 of the sensors 11 of interest).

Merely by way of example, for one or more of the outputs 32, an average and/or a variance and/or a standard deviation of the preliminary statistical indexes may be computed. In particular, an average of the average values may be computed (when in the statistics buffer 42 Stats there are stored the averages of the samples stored in the sample buffer 40 Samples). For example, relative to the output AccX of the accelerometer 18x of the longitudinal axis of the pedal crank, it is possible to compute the average of the average values and the variance based on the variances of the samples stored in the sample buffer 40 Samples, when these are stored in the statistics buffer 42 Stats:

Avg_AccXStats
Var$^2$_AccXStats.

If the number M of samples is kept constant over time, as in the case of use of a circular sample buffer 40, the average of the average values (stored in the circular statistics buffer 42) is equivalent to the average of all the samples that passed in the circular sample buffer 40 Samples since the beginning of the observation window.

Under these assumptions, the average and the variance, or in general the statistical indexes thus computed, are relative to a considerable number of samples, up to N*M, and are therefore particularly significant, in that they are less subject to the statistical error with respect to indexes computed only on a number M of samples.

The controller 30 thus provides, in block 310, for evaluating whether each of the statistical indexes computed in block 308 falls within a respective predetermined set of values, and only in case the check gives an affirmative outcome, it proceeds with calibration in block 312.

The predetermined set of values is indicative of a non-load or absence of pedaling condition, "finer" or more specific than the minimum conditions optionally checked in block 302.

The predetermined set of values may be defined by one or more thresholds, according to the output 32 of the sensor 11 involved. Merely by way of non-limiting example, it may be checked that the average Avg_TrqStats of the torque Trq is sufficiently low, for example through the formula:

$$|\text{Avg\_}{\it Trq}\text{Stats}| \le |{\it ThTrq}|$$

and/or it may be checked that the variance Var$^2$_TrqStats of the averages of the torque Trq is sufficiently low, for example through the formula:

$$\text{Var}^2\_{\it Trq}\text{Stats}| \le |{\it ThVarTrq}|.$$

In order to filter noise and measurement errors, it is also possible to check, for example, that the average Avg_TrqStats of the torque Trq is higher than a lower threshold, for example through the formula:

$$|\text{Avg\_}{\it Trq}\text{Stats}| \ge |{\it ThTrqMin}|.$$

Additional checks may be applied, optionally, also to the instantaneous outputs 32 of the sensors 11 and/or to the last statistics, for example it is possible to check that the value of torque Trq falls within the acceptable set of values, that the average of the last M samples Avg_TrqSamples (stored in TrqStats.last) falls within the acceptable set of values and/or that the variance of the last M samples Var$^2$_TrqSamples (stored in TrqStats.last) falls within the acceptable set of values.

In this manner it is ensured that the null or quasi-null detected torque condition (or other condition checked, on the torque or on another variable) is not a totally temporary, fortuitous, condition that may always occur even during pedaling.

Again merely by way of non-limiting example, it may be checked that the average Avg_AccXStats of the acceleration along the longitudinal direction of the pedal crank AccX is sufficiently high, for example through the formula:

$$|\text{Avg\_AccX}\text{Stats}| \ge |{\it ThAccX}|$$

and/or it may be checked that the variance of the averages of the acceleration along the longitudinal direction of the pedal crank AccX is sufficiently low, for example through the formula:

$$|\text{Var}^2\_\text{AccX}\text{Stats}| \le |{\it Th}\text{VarAccX}|.$$

In general, it may prove to be convenient to check that each output 32 of the sensors 11 has a low variance to check that the analyzed mechanical system is in a static or quasi-static condition, such as is desirable, for example, for calibrating a cycling power meter embedded in a pedal crank.

Furthermore, by excluding from the acceptable sets of values also average values too small in absolute value, it is possible to take noise into account. For example, if the torque Trq has a too low average absolute value, it is possibly a matter of noise.

Again merely by way of non-limiting example, in the case of a cycling power meter embedded in a pedal crank, such as for example the illustrative meter 10, alternatively or additionally to the statistical checks relative to the torque and the acceleration along the longitudinal axis of the pedal crank, it is possible to proceed with statistical checks relative to the output of the strain gauges 14*a*, 14*b*, evaluating for example the average Avg_GTopStats, Avg_GBtmStats and/or relative to the acceleration along the tangential direction to a circular motion of an end of the pedal crank carrying a pedal and/or along a rotation axis of the pedal crank, output by the accelerometers 18*y* and/or 18*z*, indicative of a tilt of the bicycle.

It is emphasized that, according to the subject-matter disclosed herein, it proves to be possible to take also other factors which can influence the measurement accuracy into account, which are conventionally ignored. For example, through a suitable evaluation of the statistics on temperature (Tint, Tair) it proves to be possible to consider thermal drift effects and/or to avoid calibrating the meter when the pedal crank is still but exposed to wind, as may occur during downhill.

Turning back to FIG. 5, in case the check of block 302 gives a negative outcome, in a block 316 the statistics are zeroed, cancelling the contents of the sample buffer 40 and of the statistics buffer 42.

The above-mentioned operations (blocks 302-316) are repeated at a predetermined frequency ƒ_stats, as schematized by block 308 of waiting for a time 1/ƒ_stats, monitored for example by a timer.

The frequency ƒ_stats of updating the statistics buffer 42 is preferably lower than the sampling frequency ƒ_smpl of updating the sample buffer 40.

Merely by way of non-limiting example, the frequency ƒ_stats may be 4 Hz, equal to a new preliminary statistical index every 250 ms, and the number N of preliminary statistical indexes stored in the statistics buffer 42 may be N=40, so that the buffer corresponds to a time observation window of 10 seconds.

The statistics buffer 42 contains N statistics (preliminary statistical indexes) on M samples each time stored in the sample buffer 40. The statistics on the last M samples is redone every ƒ_smpl/ƒ_stats new samples. With the values indicated above, each 100 new samples a statistic is redone on 1200 samples.

It is advisable for the frequency ƒ_stats to be sufficiently high, at least equal to the inverse of the observation period to which the sample buffer 40 corresponds, so that all the samples of the outputs 32 of the sensors 11 contribute to the statistics that are evaluated in block 310 (namely, do not exit the circular sample buffer 40 before entering in at least one preliminary statistical index stored in the statistics buffer 42), so that there is no loss of samples and so as to be able to evaluate at best whether there are the conditions to proceed with calibration.

It is understood that the automatic calibration 300 performed according to what is disclosed herein is particularly accurate and, as a consequence, the measurement of the cycling power during the normal operation 100 is particularly accurate.

Figure 6:
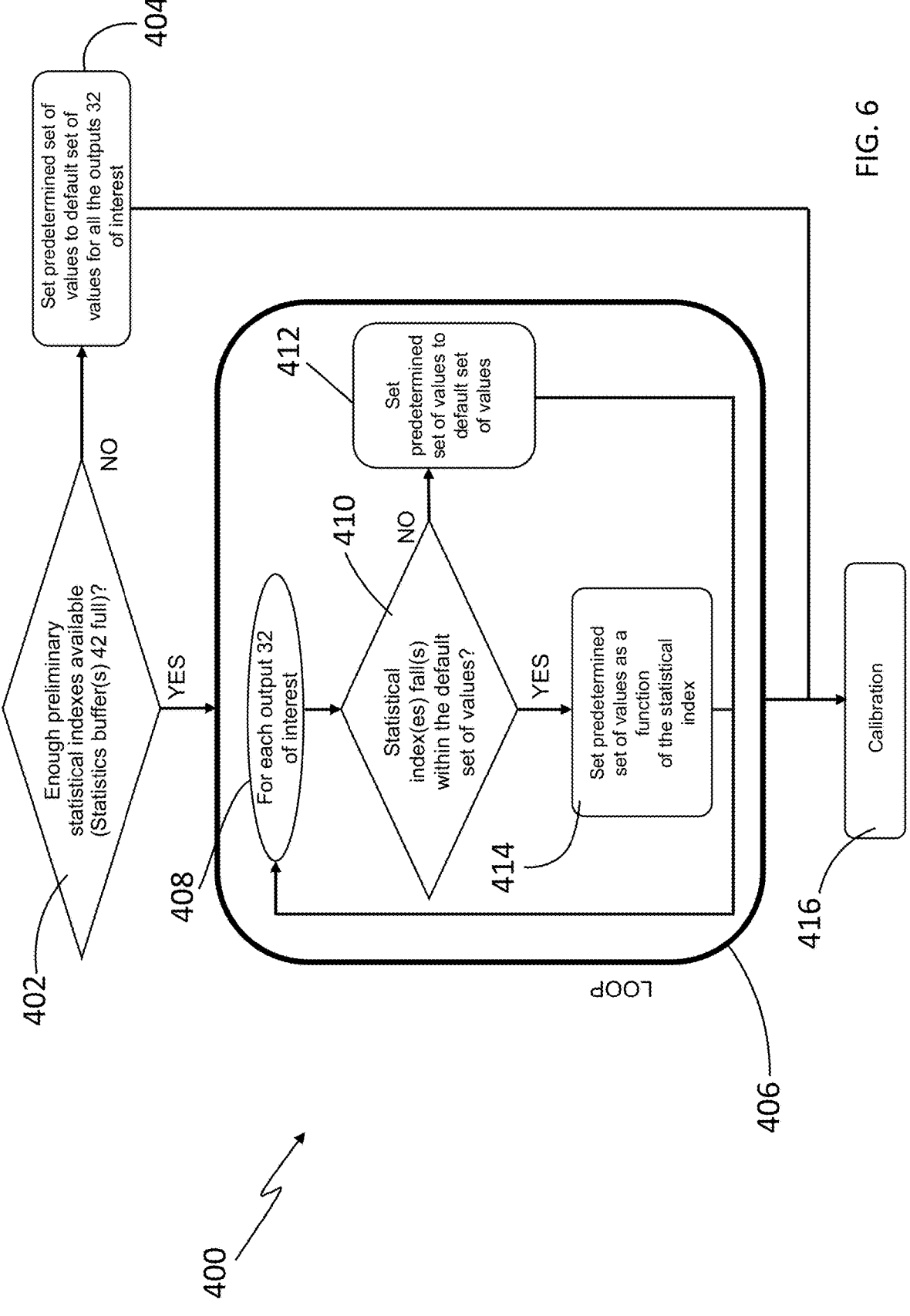

With reference to FIG. 6, the cycling power meter may, possibly, also provide for a manual calibration mode 400, wherein it is the user who ensures that the cycling power meter is actually in non-load conditions before attending to the calibration 414. For example, the user may start calibration by pressing a push-button or by acting on a lever or through a combination of operations.

According to the subject-matter disclosed herein, during manual calibration 400, the controller 30 may also provide for redefining the predetermined sets of values within which the outputs 32 of the sensors 11 (and/or the respective statistics) must fall in order to be able to subsequently proceed with automatic calibration 300, as checked by block 310 of FIG. 5.

In this manner it is possible to customize the cycling power meter 10 as a function of the mounting on the specific bicycle, for example according to the mounted pedals and/or as a function of the temperature in the region where the bicycle is used and/or of other factors.

In a block 402, the controller 30 provides for checking whether enough information to be statistically significant is available, for example by checking whether the statistics buffer 42 is full.

In case the check gives a negative outcome, as it happens for example if the cycling power meter 10 has not yet been used for an adequate time, or if the statistics have been zeroed shortly before in block 316 of FIG. 5, the controller 30 provides, in a block 404, for setting the predetermined set(s) of values used in the check of block 310 of FIG. 5, relative to each output 32 of the sensors 11, to a respective default set of values, defined in factory.

Instead, in case the check gives an affirmative outcome, the controller 30 provides, for each output 32 of the sensors 11 as indicated by the loop 406 and by its block 408, for checking in a block 410 whether the respective statistics fall within the default set of values and, in case the check gives a negative outcome, in a block 412 it provides for setting the respective predetermined sets of values, which are used in block 310 of FIG. 5, to respective default sets of values.

If instead the statistical index(es) relative to an output 32 of the sensors 11 fall(s) within the default set of values, in a block 414 the controller 30 provides for setting the predetermined set(s) of values, which are used in block 310 of FIG. 5, as a function of the statistical index itself. For example, the controller 30 provides for setting a threshold of average value of the torque Trq to average value Avg_TrqStat or to a value proportional to the average value Avg_TrqStat, and provides for setting a threshold of variance of the torque Trq to a value proportional to the variance $\text{Var}^2\_\text{TrqStat}$ or to the variance $\text{Var}^2\_\text{TrqStat}$ itself.

The check of block 410 allows avoiding setting predetermined sets of values, for example tolerance/acceptability thresholds, which could worsen the measurement accuracy, propagating incorrect calibration conditions due, for example, to an erroneous setting of the non-load conditions by the user during a preceding manual calibration procedure.

Once the sets of values have been set for all the outputs 32 of interest, the controller 30 provides in a block 416 for manual zero-power calibration.

The setting in a manual mode, of a predetermined set of values as a function of a statistical index of at least one output of at least one sensor of a cycling power meter, in which predetermined set of values the output of at least one sensor of the meter, or a datum derived therefrom, should fall, represents an innovative aspect per se.

Unless otherwise specified, the closed ranges may be replaced by open ranges and vice versa, so that the lower than or equal to/higher than or equal to symbols in the formulae may be replaced by the higher than/lower than symbols and vice versa.

Although in the previous description reference has been made, for the sake of brevity, to ranges symmetrical with respect to the zero, this is not necessary. Thus, the thresholds indicated in the formulae may be replaced by threshold pairs, one for the negative values and one for the positive values.

Instead of computing a statistical index of the data stored for example in the buffer 42 Stats, as statistical datum or index of which to evaluate whether it falls within a respective predetermined set of values, it is possible to directly compute a statistical index of the samples, stored for example in the sample buffer 40 Samples. In this case, it is necessary to lower the sampling frequency and/or increase the memory amount and/or shorten the observation duration to increase the number of samples and thus lower the statistical error.

Also during the manual calibration procedure 400, it is possible to use, in block 408, statistics carried out directly on the samples, checking in block 402 that the sample buffer 40 is full.

Vice versa, for the prerequisite check 302 it is possible to use, alternatively or additionally to the current output 32 of one or more sensors 11, a statistical function or statistical index, for example the average value. In this case, the computation of the at least one statistical index on the samples may be performed during the normal operation procedure.

The storing in the sample buffer 40 has been shown as part of a procedure in charge of measuring the cycling power, but alternatively it may be part of a procedure in charge of calibration.

Instead of storing in each statistics buffer 42 Stats also the variance, it is possible to only store the average therein, storing instead the variance of the set of samples under analysis in a respective variable which is rewritten at the frequency of the statistical analysis $f\_stats$.

Instead of using circular buffers, the controller 30 may use other equivalent data structures, for example queues, linked lists, and other data structures.

Alternatively or additionally to variance, it is possible to use the standard deviation as statistical index (and/or as preliminary statistical index) to be computed.

It is possible to provide for circular buffers 40 of a different number M1, M2 . . . of samples and/or updated at a different sampling frequency $f\_smpl$ for different outputs 32 of the sensors 11.

It is possible to provide for circular buffers 42 of a different number N1, N2 . . . of statistical indexes and/or updated at a different sampling frequency $f\_stats$ for different outputs 32 of the sensors 11.

In the case of a different number of samples and/or statistical indexes, of different update frequencies of the buffers, of computation of statistical indexes also on not completely full buffers, and in still other cases, it is possible to use suitably weighted functions, for example weighted averages instead of simple arithmetic averages.

As mentioned, the cycling power meter may comprise only some of the components described with reference to the illustrative cycling power meter 10 and/or other components.

As mentioned, the cycling power meter needs not necessarily be embedded in a pedal crank and may comprise components embedded in a pedal crank, for example a torque meter, and components embedded in other components of the bicycle, or only components embedded in one or more components of the bicycle other than a pedal crank. Those skilled in the art will understand, in the light of the present description, which changes to make according to the case, considering that in some cases, for example when the cycling power meter is applied to the bottom bracket spindle, the non-load conditions may be represented by a relative motion between components, and thus by dynamic conditions, so that the set of values in which one or more statistical variables must fall may be defined by inequalities of an opposed sense with respect to what has been described above.

The various alternative embodiments, variants and/or possibilities of each component or group of components that have been described are to be meant as combinable with each other in any manner, unless they are mutually incompatible.

The above is a description of various embodiments, variants and/or possibilities of inventive aspects, and further changes can be made without departing from the scope of the present invention. The shape and/or size and/or location and/or orientation of the various components and/or the succession of the various steps can be changed.

The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

The invention claimed is:

1. A cycling power meter comprising:

at least one sensor configured to generate at least one output, being at least one electric signal, wherein the at least one output is indicative of pedaling movement;

a controller, the controller being configured to:

store the at least one output in a memory, derive a cycling power based on the at least one output, and perform a zero-power calibration based on the at least one output in a non-load condition through the steps of:

computing at least one statistical index relative to a quantitative change of the at least one output over time, storing the statistical index in the memory, evaluating whether the at least one statistical index A) falls or B) does not fall within a respective predetermined set of values indicative of a non-load condition suitable for accurate calibration, and performing the zero-power calibration only in case A) or not performing the zero-power calibration in case B) thereby improving accuracy of the zero-power calibration, wherein the controller is configured to compute the at least one statistical index through the steps of:

a) obtaining samples from the at least one output by obtaining a numerical datum from the at least one output, when the sensor is a digital sensor, and/or by quantization of the at least one output, when the at least one sensor is an analogue sensor, b) computing at least one preliminary statistical index relative to a first predetermined number, M, of last samples among the samples, c) storing the at least one preliminary statistical index, d) repeating steps b) and c) until obtaining a second number, N, of preliminary statistical indexes, and e) computing the at least one statistical index relative to the preliminary statistical indexes.

2. The cycling power meter according to claim 1, wherein the at least one statistical index is selected from the group consisting of average, variance, standard deviation, average of average values, variance of average values, standard deviation of average values, and variance of variances.

3. The cycling power meter according to claim 1, wherein the controller is configured to check, before step c), that predetermined minimum conditions are met, indicative of absence of pedaling, and, if not, to zero the stored statistical indexes and preliminary statistical indexes and restart the repeating of steps b) and c) according to step d).

4. The cycling power meter according to claim 3, wherein the cycling power meter is embedded in a bicycle pedal crank and the predetermined minimum conditions comprise alignment of the pedal crank with a vertical direction.

5. The cycling power meter according to claim 1, wherein the controller is configured to further perform the zero-power calibration in a manual mode, and, during the zero-power calibration in the manual mode, to:

if the first number, M, of samples is not available, set the predetermined set of values to a default set of values, if the first number, M, of samples is available, set the predetermined set of values to a user set of values computed as a predetermined function of the at least one statistical index relative to the at least one output.

6. The cycling power meter according to claim 5, wherein the controller is configured to, if the first number, M, of samples is available, check whether the statistical index falls within the default set of values and, if not, set instead the predetermined set of values to the default set of values.

7. The cycling power meter according to claim 6, wherein the predetermined function is a direct proportionality function.

8. The cycling power meter according to claim 1, wherein the controller is configured to store the first number, M, of samples in a first circular buffer of the memory and/or to store the second number, N, of preliminary statistical indexes in a second circular buffer of the memory.

9. The cycling power meter according to claim 1, wherein the controller is configured to further perform the zero-power calibration in a manual mode, and, during the zero-power calibration in the manual mode, to:

if the second number, N, of preliminary statistical indexes is not available, set the predetermined set of values to a default set of values, if the second number, N, of preliminary statistical indexes is available, set the predetermined set of values to a user set of values computed as a predetermined function of the at least one statistical index relative to the at least one output.

10. The cycling power meter according to claim 9, wherein the controller is configured to, if the second number, N, of preliminary statistical indexes is available, check whether the statistical index falls within the default set of values and, if not, set instead the predetermined set of values to the default set of values.

11. The cycling power meter according to claim 10, wherein the predetermined function is a direct proportionality function.

12. The cycling power meter according to claim 1, embedded in a bicycle pedal crank, and wherein the at least one sensor comprises at least one torque meter and an accelerometer and the at least one output comprises at least one electric signal related to a torque and an electric signal related to an acceleration along a longitudinal axis of the pedal crank.

13. The cycling power meter according to claim 12, wherein the at least one sensor comprises at least one strain gauge and the at least one output comprises at least one electric signal related to the strain gauge resistance.

14. The cycling power meter according to claim 13, wherein the at least one output further comprises an electric signal related to an acceleration along a tangential direction to a circular motion of an end of the pedal crank carrying a pedal.

15. The cycling power meter according to claim 14, wherein the at least one sensor further comprises at least one thermometer and the at least one output further comprises at least one electric signal related to a temperature.

16. The cycling power meter according to claim 15, wherein the at least one output further comprises an electric signal related to an acceleration along a rotation axis of the pedal crank.

* * * * *